(12) United States Patent
Rose et al.

(10) Patent No.: US 10,497,368 B2
(45) Date of Patent: Dec. 3, 2019

(54) TRANSMITTING AUDIO TO AN IDENTIFIED RECIPIENT

(71) Applicant: LENOVO (Singapore) PTE. LTD., New Tech Park (SG)

(72) Inventors: Amy Leigh Rose, Chapel Hill, NC (US); John Scott Crowe, Durham, NC (US); Gary David Cudak, Wake Forest, NC (US); Jennifer Lee-Baron, Morrisville, NC (US); Nathan J. Peterson, Oxford, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/677,942

(22) Filed: Aug. 15, 2017

(65) Prior Publication Data
US 2019/0056905 A1    Feb. 21, 2019

(51) Int. Cl.
| | |
|---|---|
| *G10L 15/22* | (2006.01) |
| *G06F 3/16* | (2006.01) |
| *G06F 16/683* | (2019.01) |
| *G10L 15/00* | (2013.01) |
| *G06F 16/60* | (2019.01) |

(52) U.S. Cl.
CPC .............. *G10L 15/22* (2013.01); *G06F 3/167* (2013.01); *G06F 16/685* (2019.01); *G06F 16/60* (2019.01); *G10L 15/005* (2013.01)

(58) Field of Classification Search
CPC ............................. G10L 15/22; G10L 15/226
USPC .......................................................... 704/275
See application file for complete search history.

(56) References Cited

U.S. PATENT DOCUMENTS

| | | | |
|---|---|---|---|
| 9,712,800 B2* | 7/2017 | St. Clair .................. | H04N 5/76 |
| 2014/0108501 A1* | 4/2014 | Papakipos ............. | G06F 16/583 |
| | | | 709/203 |
| 2015/0109104 A1* | 4/2015 | Fadell .................. | G08B 27/003 |
| | | | 340/5.65 |
| 2015/0142895 A1* | 5/2015 | Beran ..................... | H04L 51/04 |
| | | | 709/206 |
| 2015/0172462 A1* | 6/2015 | Cudak ................. | H04M 3/4365 |
| | | | 455/413 |
| 2016/0373909 A1* | 12/2016 | Rasmussen ............. | H04W 4/80 |
| 2018/0288104 A1* | 10/2018 | Padilla ................ | H04L 65/1069 |

* cited by examiner

*Primary Examiner* — Shaun Roberts
(74) *Attorney, Agent, or Firm* — Kunzler Bean & Adamson

(57) ABSTRACT

Apparatuses, methods, systems, and program products are disclosed for transmitting audio to an identified recipient. A method includes detecting, by a processor, audio input at a first information handling device. The audio input is intended for a recipient. The method includes deriving an identity of the intended recipient of the audio input based on the audio input. The method includes transmitting the audio input to a second information handling device that is associated with the intended recipient.

12 Claims, 5 Drawing Sheets

TRANSMITTING AUDIO TO AN IDENTIFIED RECIPIENT

FIELD

The subject matter disclosed herein relates to audio transmissions and more particularly relates to transmitting audio to a device associated with an identified recipient.

BACKGROUND

Homes and offices may be preconfigured with intercom systems that allow users to communicate remotely using the intercom system. However, such an intercom system may not be standard, may be expensive, or may otherwise be prohibitive to install. Furthermore, such intercom systems may only provide broadcast functionality and may not be capable of dynamically directing audio to specific persons.

BRIEF SUMMARY

An apparatus for transmitting audio to an identified recipient is disclosed. The apparatus, in one embodiment, includes a processor and a memory that stores code executable by the processor. In one embodiment, the memory stores code executable by the processor to detect audio input intended for a recipient. In a further embodiment, the memory stores code executable by the processor to derive an identity of the intended recipient of the audio input based on the audio input. In certain embodiments, the memory stores code executable by the processor to transmit the audio input to a second information handling device that is associated with the intended recipient.

A method for transmitting audio to an identified recipient includes detecting, by a processor, audio input at a first information handling device. The audio input may be intended for a recipient. The method includes deriving an identity of the intended recipient of the audio input based on the audio input. The method includes transmitting the audio input to a second information handling device that is associated with the intended recipient A program product for transmitting audio to an identified recipient, in one embodiment, includes a computer readable storage medium that stores code executable by a processor. In some embodiments, the executable code includes code to perform detecting audio input at a first information handling device. The audio input may be intended for a recipient. The executable code includes code to perform deriving an identity of the intended recipient of the audio input based on the audio input. The executable code includes code to perform transmitting the audio input to a second information handling device that is associated with the intended recipient.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
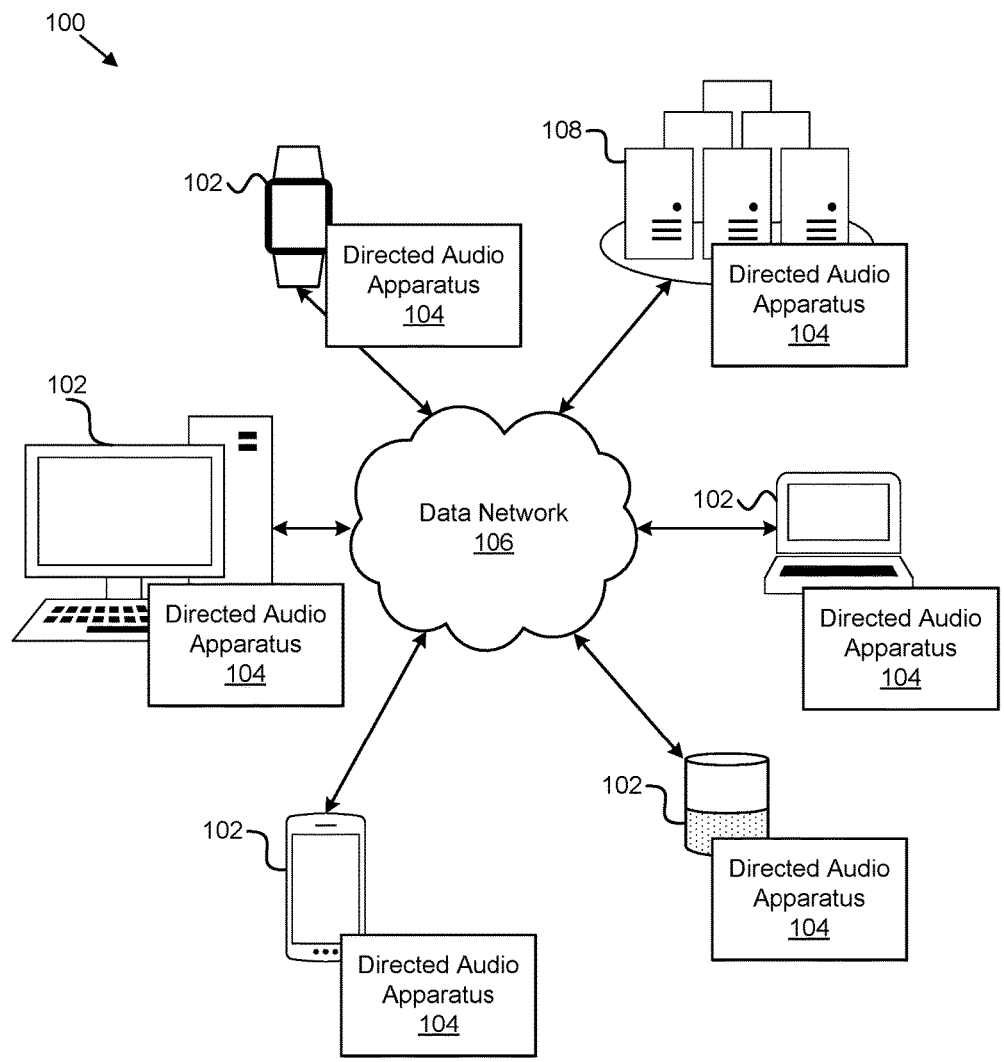
FIG. 1 is a schematic block diagram illustrating one embodiment of a system for transmitting audio to an identified recipient.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for dynamically changing sound settings of a device. In one embodiment, the system 100 includes one or more information handling devices 102, one or more directed audio apparatuses 104, one or more data networks 106, and one or more servers 108. In certain embodiments, even though a specific number of information handling devices 102, directed audio apparatuses 104, data networks 106, and servers 108 are depicted in FIG. 1, one of skill in the art will recognize, in light of this disclosure, that any number of information handling devices 102, directed audio apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include speakers, or other hardware, configured to produce sounds. The information handling devices 102 may include microphones, or other sound input devices, for receiving audio input.

In one embodiment, the directed audio apparatus 104 is configured to detect audio input that is intended for a recipient, derive an identity of the intended recipient of the audio input based on the audio input, and transmit the audio input to an information handling device that is associated with the intended recipient. The directed audio apparatus 104, including its various sub-modules, may be located on one or more information handling devices 102 in the system 100, one or more servers 108, one or more network devices, and/or the like. The directed audio apparatus 104 is described in more detail below with reference to FIGS. 2 and 3.

In one embodiment, the directed audio apparatus 104 provides a solution over conventional intercom-type communications by using existing devices on a network, such as a home network, to receive audio input for a particular person, determine who that particular person is, locate a device on the network that is within a proximity of the particular person, and transmit the audio input directly to the located device. The person that the audio input is directed to can then respond through the device that the audio input was transmitted to in order to initiate a conversation with the person that provided the audio message. In this manner, the directed audio apparatus 104 can dynamically establish an ad-hoc intercom system, and provide direct communications between two or more people using existing devices on a network.

In various embodiments, the directed audio apparatus 104 may be embodied as a hardware appliance that can be installed or deployed on an information handling device 102, on a server 108, or elsewhere on the data network 106. In certain embodiments, the directed audio apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the directed audio apparatus 104 may include a power interface, a wired and/or wireless network interface, a graphical interface that attaches to a display, and/or a semiconductor integrated circuit device as described below, configured to perform the functions described herein with regard to the directed audio apparatus 104.

The directed audio apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the directed audio apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the directed audio apparatus 104.

The semiconductor integrated circuit device or other hardware appliance of the directed audio apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the directed audio apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102.

Figure 2:
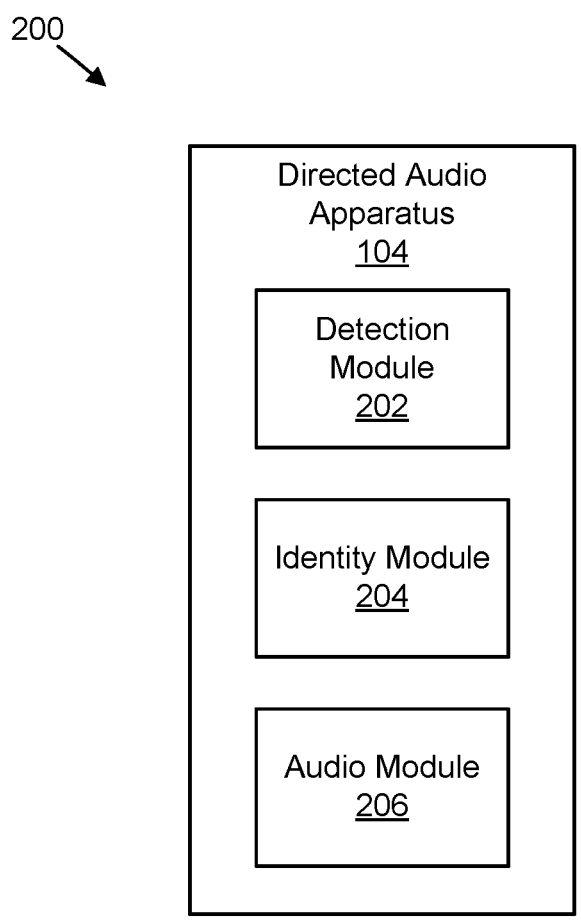
FIG. 2 is a schematic block diagram illustrating one embodiment of an apparatus for transmitting audio to an identified recipient.

FIG. 2 is a schematic block diagram illustrating one embodiment of an apparatus 200 for transmitting audio to an identified recipient. In one embodiment, the apparatus 200 includes an embodiment of a directed audio apparatus 104. The directed audio apparatus 104, in some embodiments, includes one or more of a detection module 202, an identity module 204, and an audio module 206, which are described in more detail below.

The detection module 202, in one embodiment, is configured to detect audio input intended for one or more recipients. The detection module 202 may detect audio input using a microphone, or other audio input device, of an information handling device 102. The detection module 202 may distinguish between different types of audio input, and only detect voice audio input. For example, the detection module 202 may only detect and receive spoken or voice audio input, and may ignore other types of audio such as ambient noise, music, and/or the like. The detection module 202 may store the detected audio input on volatile or non-volatile storage of the information handling device 102 that is used to detect the audio input.

The identity module 204, in one embodiment, is configured to derive an identity of the intended recipient of the audio input based on the audio input that the detection module 202 detects. In certain embodiments, the identity module 204 performs sound or voice processing to determine one or more identifiers for intended recipients of the audio input. In further embodiments, the identity module 204 transcribes the audio input and performs natural language processing on the transcription of the audio input to determine one or more identifiers for intended recipients of the audio input. The one or more identifiers may include a name, a nickname, a description of a person (e.g., clothing, facial features, body features, etc.), and/or other identifying information.

In one embodiment, the identity module 204 maintains a database of identifying information for one or more persons, which may be stored at a central location on the data network 106, or at each device that is connected to the data network 106. A user may manually associate the identifying information that the identity module 204 stores with certain persons, and/or the identity module 204 may learn identity information over time and associate the identity information with certain persons. For instance, a user may enter a name and an image of a person that is associated with the name that the identity module 204 stores. In another example, the identity module 204 may actively monitor audio for names, nicknames, and other identifying information, and may process images or videos of persons when they are in a proximity of a device to determine identifying information and the persons that are associated with the identifying information (e.g., if a person calls another person's name, the identity module 204 may detect the person's name and detect in a video that the person reacts to the his name being called).

In one embodiment, the audio module 206 is configured to transmit the audio input to an information handling device 102 that is associated with the one or more identified intended recipients. The device that the audio module 206 transmits the audio input to may be a device that is worn by the user (e.g., a smart watch or fitness band), a device that the user carries with him (e.g., a smart phone or tablet), a device that is within a proximity of the user, (e.g., a smart speaker, a smart TV, a computer).

In one example embodiment, the detection module 202 may detect the audio input "Hey, John, will you come to the kitchen?" at a smart speaker in a kitchen. The identity module 204 may analyze the audio input and determine that the audio input is intended for John. The audio module 206 may determine that John is within a proximity of another smart speaker located in the living room. The audio module 206 may directly transmit the audio input to the smart speaker in the living room so that it can be output from the smart speaker for John to hear. In this manner, the audio module 206 may establish a communication channel (e.g., a directed intercom) between the two smart speakers so that they may be used as an intercom system to facilitate communications between John and the other user.

Figure 3:
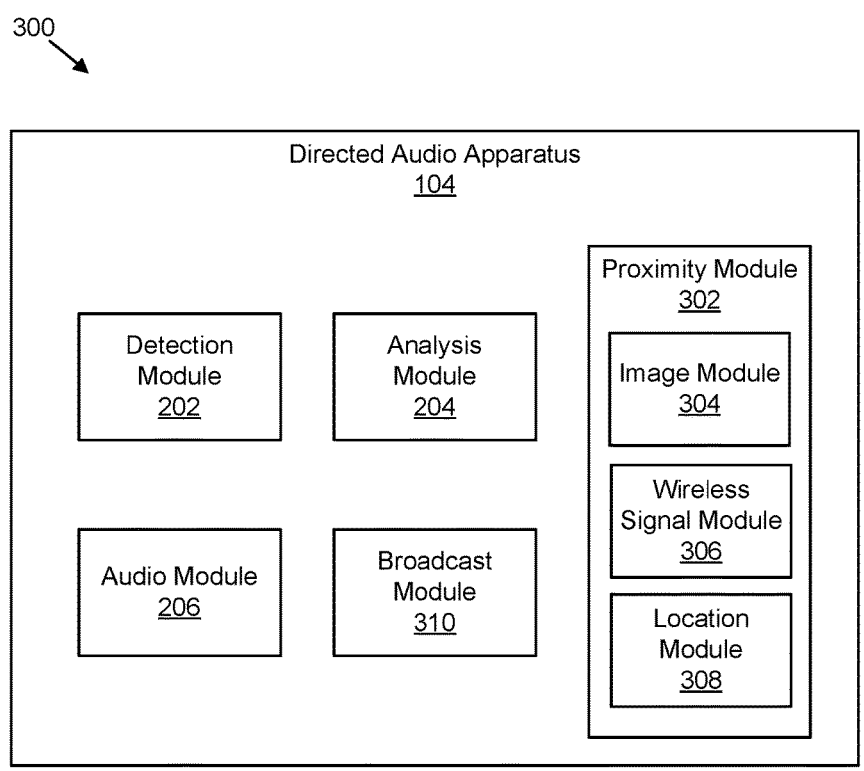
FIG. 3 is a schematic block diagram illustrating one embodiment of another apparatus for transmitting audio to an identified recipient.

FIG. 3 is a schematic block diagram illustrating one embodiment of an apparatus 300 for transmitting audio to an identified recipient. In one embodiment, the apparatus 300 includes an embodiment of a directed audio apparatus 104. The directed audio apparatus 104, in some embodiments, includes one or more of a detection module 202, an identity module 204, and an audio module 206, which may be substantially similar to the detection module 202, the identity module 204, and the audio module 206 described above with reference to FIG. 2. In a further embodiment, the directed audio apparatus 104 includes one or more of a proximity module 302, which may include an image module 304, a wireless signal module 306, and location module 308, and a broadcast module 310, which are described in more detail below.

The proximity module 302, in one embodiment, is configured to dynamically determine an information handling device 102 of a plurality of available information handling devices 102 to transmit the audio input to based on a proximity of the intended recipient of the audio input to the information handling device 102. For instance, the proximity module 302 may determine that an intended recipient of the audio input is within a proximity of a smart speaker, a smart phone, and/or a smart watch, which are each connected to the data network 106 and are capable of outputting the audio input, and may transmit the audio input to one or more of the smart speaker, smart phone, and/or smart watch.

In one embodiment, to determine the proximity of the intended recipient to each of the plurality of available information handling devices 102, the proximity module 302 may include an instance of an image module 304 that analyzes image data associated with the plurality of available information handling devices 102. The image module 304, for instance, may analyze image data captured by various devices on the data network 106 to determine whether an intended recipient is in the images, and the device that captured the images that include the intended recipient.

For example, the image module 304 may perform image processing on the images, e.g., facial recognition, to recognize persons within the images. The image module 304 may compare the captured images of persons against an image database of persons' characteristics, e.g., an image database of faces, facial features, body features, and/or the like, to identify the person in the images. If the image module 304 determines that a person in an image matches the person that is identified as the intended recipient in the audio input, the image module 302 and/or the proximity module 302 may determine which device captured the image and/or which devices are within a proximity of the device that captured the image so that the audio module 206 can transmit the audio input to the device(s) that is within a proximity of the intended recipient.

In one embodiment, to determine the proximity of the intended recipient to each of the plurality of available information handling devices 102, the proximity module 302 may include an instance of a wireless signal module 306 that is configured to analyze wireless signal data detected at one or more devices on the data network 106 that may be associated with an intended recipient of the audio input. For instance, a device may detect unique Wi-Fi signals, Bluetooth® signals, NFC signals, infrared signals, and/or the like that are emitted from one or more devices that a person is wearing, carrying, or is otherwise associated with.

The wireless signal module 306 may analyze the wireless signals for identifying information and cross-reference the analyzed wireless signal identifying information with predetermined, pre-stored, or the like, wireless signal data that is associated with particular persons. If the wireless signal module 306 determines that wireless signal data detected at a device matches predetermined wireless signal data associated with a user, the wireless signal module 306 and/or the proximity module 302 may determine which device detected the wireless signal data and/or which devices are within a proximity of the device that captured the wireless signal data so that the audio module 206 can transmit the audio input to the device(s) that is within a proximity of the intended recipient.

In one embodiment, to determine the proximity of the intended recipient to each of the plurality of available information handling devices 102, the proximity module 302 may include an instance of a location module 308 that is configured to determine a location of a person and determine whether the determined location is within a proximity of a device connected to the data network 106 that is capable of outputting the audio input. For instance, a device may detect a location associated with a person, or a device that is worn, carried, or otherwise associated with the person, using location services, GPS, triangulation, and/or the like. The location may be an absolute location, e.g., a GPS coordinate, a longitude/latitude measurement, and/or the like, or may be a relative location within a home, e.g., a particular room, floor, or the like.

Based on the determined location, the location module 308 and/or the proximity module 302 may determine whether the determined location is within a proximity of a device connected to the data network 106 that is capable of outputting the audio input. For example, the location module 308 may compare the determined location to a predetermined or predefined location of a device on the data network 106 to determine whether the determined location is within a predefined proximity of the device on the data network 106. In further embodiments, after the location module 308 determines a location of a person, the proximity module 302 may further analyze image data and/or wireless signal data to identify the person at the determined location to determine whether the person is an intended recipient of the audio input.

In one embodiment, the broadcast module 310 transmits the audio input to each of the devices on the data network 106 that are capable of outputting the audio input in response to determining that the intended recipient is not within a proximity of any of the devices on the data network 106. For example, if the intended recipient cannot be identified by the proximity module 302 using image data, wireless signal data, and/or location data, the broadcast module 310 may send the audio input to any and all devices on the data network 106 that can output the audio input.

In some embodiments, if the broadcast module 310 receives an audio response from at least one of the devices on the data network 106 after the audio input is broadcast to the devices on the data network 106, the broadcast module 310 and/or the audio module 206 may restrict any additional audio input that is associated with the initial audio input to the device on the data network 106 that the audio response was received from. The broadcast module 310, for instance, may restrict future communications to the MAC address, the IP address, the hostname, and/or the like of the device that the audio response was received on, for this particular communication session.

For example, the broadcast module 310 may send the audio input to three different smart speakers within a home. An intended recipient may hear the audio input and respond using the smart speaker in the kitchen. In response to receiving the audio response, the audio module 206 may restrict further audio communications to the smart speaker in the kitchen so that the audio communications are not broadcast to other devices.

Figure 4:
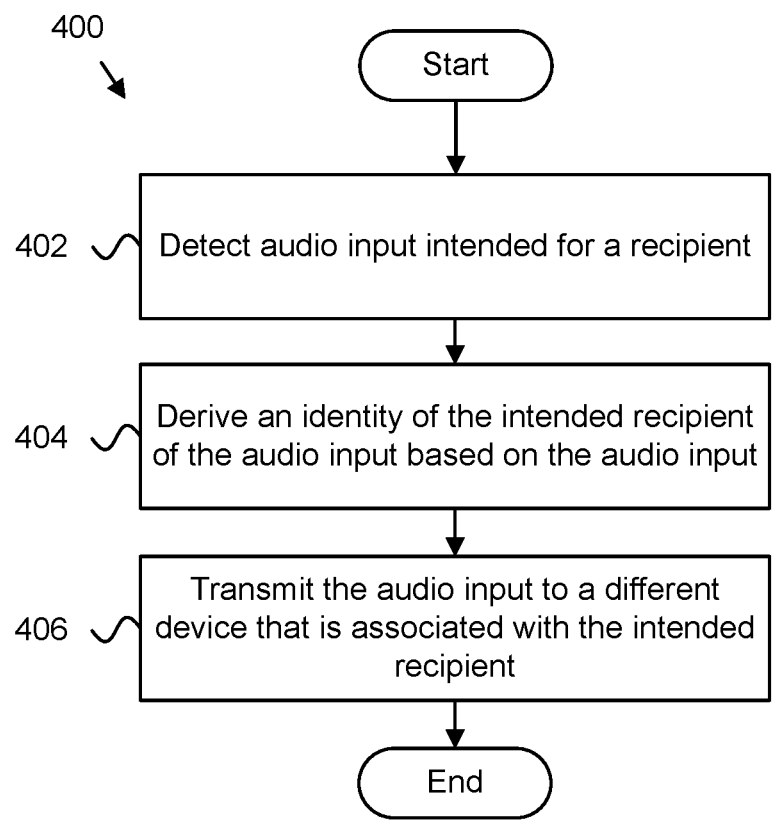
FIG. 4 is a schematic flow chart diagram illustrating one embodiment of a method for transmitting audio to an identified recipient.

FIG. 4 is a schematic flow chart diagram illustrating one embodiment of a method 400 for transmitting audio to an identified recipient. In one embodiment, the method 400 begins and the detection module 202 detects 402 audio input intended for a recipient. In further embodiments, the analysis module 204 derives 404 an identity of the intended recipient of the audio input based on the audio input. In certain embodiments, the audio module 206 transmits 406 the audio input to a different device that is associated with the intended recipient, and the method 400 ends.

Figure 5:
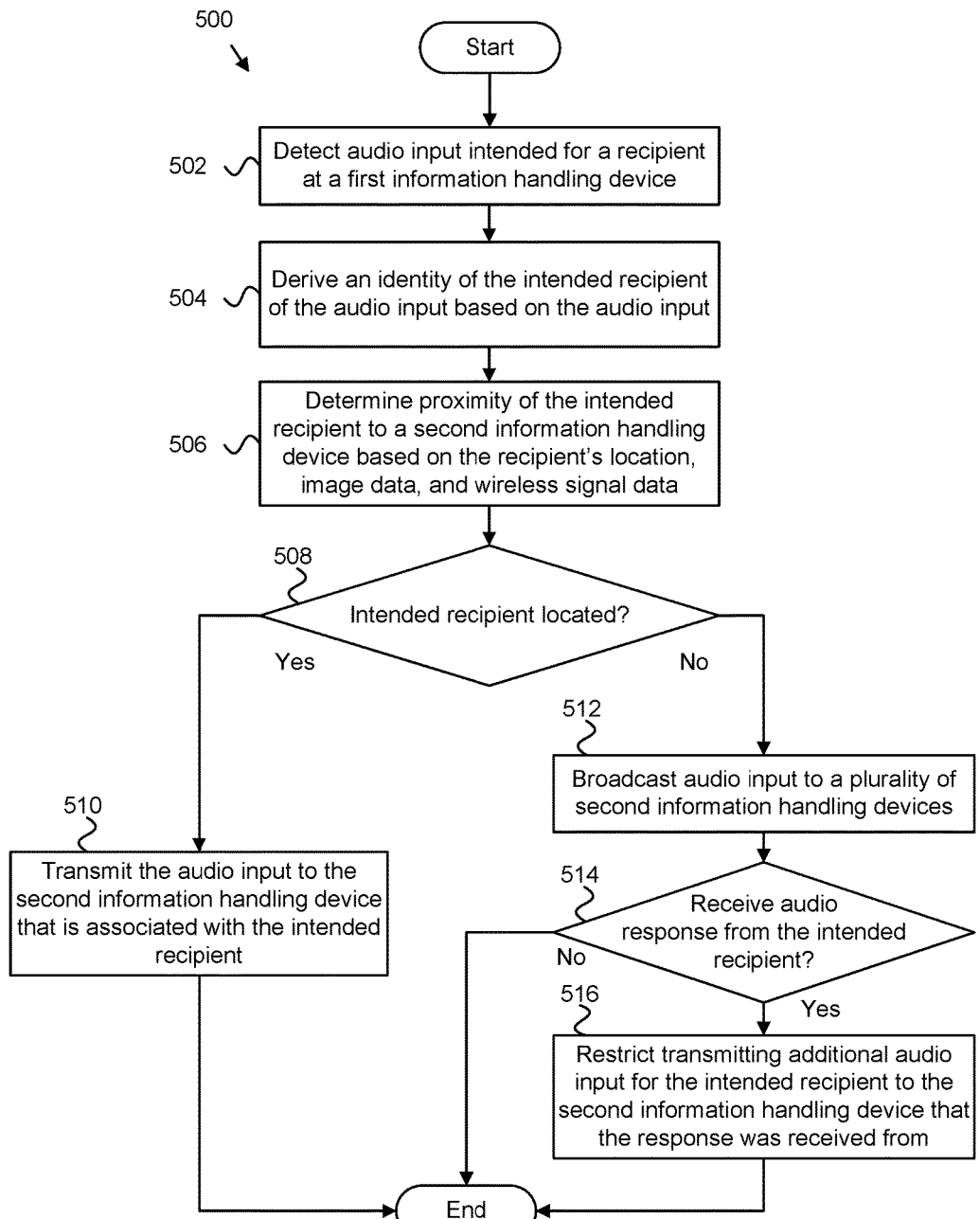
FIG. 5 is a schematic flow chart diagram illustrating one embodiment of another method for transmitting audio to an identified recipient.

FIG. 5 is a schematic flow chart diagram illustrating one embodiment of another method 500 for transmitting audio to an identified recipient. In one embodiment, the method 500 begins and the detection module 202 detects 502, at a first device, audio input intended for a recipient. In further embodiments, the analysis module 204 derives 504 an identity of the intended recipient of the audio input based on the audio input.

In one embodiment, the proximity module 302 determines 506 a proximity of the intended recipient to one or more second devices on the data network 106 based on image data that is captured and analyzed by the image module 304, wireless signal data that is captured and analyzed by the wireless signal module 306, and/or location data that is captured and analyzed by the location module 308. If the proximity module 302 locates 508 the intended recipient based on the foregoing data, in certain embodiments, the audio module 206 transmits 510 the audio input to a second device that is associated with the intended recipient, and the method 500 ends.

Otherwise, the broadcast module 310 broadcasts 512 the audio input to a plurality of second devices on the data network 106. If the broadcast module 310 receives 514 an audio response from the intended recipient at a particular second device, the broadcast module 310 and/or the audio module 206 restrict 516 future audio transmissions or communications with the intended recipient during this communication session to the particular second device that the audio response was received from, and the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
a processor of a first information handling device;
a memory of the first information handling device that stores code executable by the processor to:
in response to a plurality of persons being within a proximity of the first information handling device and/or one or more second information handling devices:
capture audio of conversations between the plurality of persons;
capture images and/or videos of the plurality of persons that corresponds to the captured audio;
process the captured images and/or videos to detect a reaction from a person of the plurality of persons in response to identifying information in the captured audio that corresponds to the captured images and/or videos; and
store the identifying information, the images and/or videos of the person, and wireless signal data for the person in a central database;
detect, at the first information handling device, audio input intended for a recipient;
transcribe the audio input to determine one or more identifiers for an intended recipient of the audio input, the one or more identifiers including a description of the intended recipient;
derive an identity of the intended recipient of the audio input based on the one or more identifiers determined from the transcription of the audio input by cross-referencing the one or more identifiers with the identifying information in the database;
detect wireless signal data at one or more of a plurality of second information handling devices, the wireless signal data comprising unique identifiers associated with mobile devices of one or more persons, the plurality of second information handling devices comprising devices that are available to send the audio input to that is nearest to the intended recipient;
determine that the intended recipient is within a proximity of a second information handling device of the plurality of second information handling devices in response to cross-referencing wireless signal data detected at the second information handling device with previously-stored wireless signal data in the database associated with the intended recipient;
in response to determining that the intended recipient is within a proximity of the second information handling device, transmit the audio input to the second information handling device;
in response to determining that the intended recipient is not within a proximity of any of the plurality of second information handling devices, transmit the audio input to each of the plurality of second information handling devices;
receive an audio response from at least one of the plurality of second information handling devices that received the transmitted audio input; and
restrict transmitting additional audio input associated with the initial audio input to the second information handling device that the audio response was received from.

2. The apparatus of claim 1, further comprising code executable by the processor to analyze image data associated with the plurality of second information handling devices to determine the proximity of the intended recipient to each of the plurality of second information handling device.

3. The apparatus of claim 2, further comprising code executable by the processor to perform facial recognition on the image data to determine whether the image data comprises an image of the intended recipient.

4. The apparatus of claim 1, wherein the wireless signal data comprises a unique identifier for the intended recipient, the wireless signal data received from wireless signals selected from the group consisting of Bluetooth® signals, Wi-Fi signals, near-field communication signals, and infrared signals.

5. The apparatus of claim 1, further comprising code executable by the processor to determine a location of the intended recipient and determine whether the determined location is within a proximity of at least one of the plurality of second information handling devices.

6. The apparatus of claim 1, further comprising code executable by the processor to provide feedback that the intended recipient of the audio input is not within a proximity of any of the plurality of second information handling devices.

7. The apparatus of claim 1, wherein the first and the second information handling devices are communicatively connected via a local area network.

8. The apparatus of claim 1, wherein at least one of the first and second information handling devices comprises a smart speaker device.

9. A method comprising:
in response to a plurality of persons being within a proximity of the first information handling device and/or one or more second information handling devices:
capturing audio of conversations between the plurality of persons;
capturing images and/or videos of the plurality of persons that corresponds to the captured audio;
processing the captured images and/or videos to detect a reaction from a person of the plurality of persons in response to identifying information in the captured audio that corresponds to the captured images and/or videos; and
storing the identifying information and the images and/or videos of the person in a central database;
detecting, by a processor, audio input at a first information handling device, the audio input intended for a recipient;
transcribing the audio input to determine one or more identifiers for an intended recipient of the audio input, the one or more identifiers including a description of the intended recipient;
deriving an identity of the intended recipient of the audio input based on the one or more identifiers determined from the transcription of the audio input by cross-referencing the one or more identifiers with the identifying information in the database;
detecting wireless signal data at one or more of a plurality of second information handling devices, the wireless signal data comprising unique identifiers associated with mobile devices of one or more persons, the plurality of second information handling devices comprising devices that are available to send the audio input to that is nearest to the intended recipient;
determining that the intended recipient is within a proximity of a second information handling device of the plurality of second information handling devices in response to cross-referencing wireless signal data detected at the second information handling device with previously-stored wireless signal data in the database associated with the intended recipient;
in response to determining that the intended recipient is within a proximity of the second information handling device, transmitting the audio input to the second information handling device;
in response to determining that the intended recipient is not within a proximity of any of the plurality of second information handling devices, transmitting the audio input to each of the plurality of second information handling devices;
receiving an audio response from at least one of the plurality of second information handling devices that received the transmitted audio input; and
restricting transmitting additional audio input associated with the initial audio input to the second information handling device that the audio response was received from.

10. The method of claim 9, further comprising analyzing image data associated with the plurality of second information handling devices to determine the proximity of the intended recipient to each of the plurality of second information handling device.

11. The method of claim 9, further comprising determining a location of the intended recipient and determining whether the determined location is within a proximity of at least one of the plurality of second information handling devices.

12. A program product comprising a non-transitory computer readable storage medium that stores code executable by a processor, the executable code comprising code to perform:
in response to a plurality of persons being within a proximity of the first information handling device and/or one or more second information handling devices:
capturing audio of conversations between the plurality of persons;
capturing images and/or videos of the plurality of persons that corresponds to the captured audio;
processing the captured images and/or videos to detect a reaction from a person of the plurality of persons in response to identifying information in the captured audio that corresponds to the captured images and/or videos; and
storing the identifying information and the images and/or videos of the person in a central database;
detecting audio input at a first information handling device, the audio input intended for a recipient;
transcribing the audio input to determine one or more identifiers for an intended recipient of the audio input, the one or more identifiers including a description of the intended recipient;
deriving an identity of the intended recipient of the audio input based on the one or more identifiers determined from the transcription of the audio input by cross-referencing the one or more identifiers with the identifying information in the database;
detecting wireless signal data at one or more of a plurality of second information handling devices, the wireless signal data comprising unique identifiers associated with mobile devices of one or more persons, the plurality of second information handling devices comprising devices that are available to send the audio input to that is nearest to the intended recipient;
determining that the intended recipient is within a proximity of a second information handling device of the plurality of second information handling devices in response to cross-referencing wireless signal data detected at the second information handling device with previously-stored wireless signal data in the database associated with the intended recipient;
in response to determining that the intended recipient is within a proximity of the second information handling device, transmitting the audio input to the second information handling device;
in response to determining that the intended recipient is not within a proximity of any of the plurality of second information handling devices, transmitting the audio input to each of the plurality of second information handling devices;

receiving an audio response from at least one of the plurality of second information handling devices that received the transmitted audio input; and restricting transmitting additional audio input associated with the initial audio input to the second information handling device that the audio response was received from.

* * * * *